(12) United States Patent
Matsuno

(10) Patent No.: US 12,507,684 B2
(45) Date of Patent: Dec. 30, 2025

(54) ELECTRIC FISHING REEL

(71) Applicant: GLOBERIDE, Inc., Tokyo (JP)

(72) Inventor: Keisuke Matsuno, Tokyo (JP)

(73) Assignee: GLOBERIDE, INC., Tokyo (JP)

(*) Notice: Subject to any disclaimer, the term of this patent is extended or adjusted under 35 U.S.C. 154(b) by 252 days.

(21) Appl. No.: 18/241,050

(22) Filed: Aug. 31, 2023

(65) Prior Publication Data

US 2024/0081305 A1    Mar. 14, 2024

(30) Foreign Application Priority Data

Sep. 9, 2022 (JP) ................. 2022-144007

(51) Int. Cl.
*A01K 89/01* (2006.01)
*A01K 89/015* (2006.01)
(Continued)

(52) U.S. Cl.
CPC ........ *A01K 89/017* (2013.01); *A01K 89/0155* (2013.01); *A01K 89/0186* (2015.05); *A01K 89/0192* (2015.05); *A01K 89/01931* (2015.05)

(58) Field of Classification Search
CPC .............. A01K 89/017; A01K 89/0187; A01K 89/0188; A01K 89/01901; A01K 89/0192; A01K 89/05; A01K 89/053; A01K 89/059
See application file for complete search history.

(56) References Cited

U.S. PATENT DOCUMENTS 5,222,995 A * 6/1993 Sato ................... A01K 89/0192
                                              242/258
6,053,444 A * 4/2000 Yamaguchi ...... A01K 89/01917
                                              242/280

(Continued)

FOREIGN PATENT DOCUMENTS

CN     104621064 A     5/2015
CN     107125219 A  *  9/2017  ....... A01K 89/01557

(Continued)

OTHER PUBLICATIONS

Feb. 16, 2024 Office Action issued in Taiwanese Patent Application No. 112131252.

(Continued)

*Primary Examiner* — Emmanuel M Marcelo
(74) *Attorney, Agent, or Firm* — Oliff PLC

(57) ABSTRACT

An electric fishing reel comprises a reel main body that comprises a left frame and a right frame and side plates covering the left and right frames, an operating part that is provided on a side of the left frame or a side of the right frame and is rotatable, a handle shaft of the operating part, a drive gear that comprises a cylindrical portion and a tooth surface and is rotatably frictionally coupled to the handle shaft, and a drag washer that is non-rotatably fitted to the handle shaft and is provided at an end of the drive gear on a side in a direction of the handle shaft, in which a protruding portion protruding in a direction of the drive gear from an inside of the side plate covering the left frame or the right frame is provided, and an end of the protruding portion is formed to be separated by a distance equal to or less than 3.0 mm with respect to an upper surface of the drive gear as viewed in the direction of the handle shaft.

4 Claims, 3 Drawing Sheets

(51) Int. Cl.
*A01K 89/0155* (2006.01)
*A01K 89/017* (2006.01)

(56) References Cited

U.S. PATENT DOCUMENTS

| | | | | |
|---|---|---|---|---|
| 6,530,535 | B2* | 3/2003 | Oishi | A01K 89/05 |
| | | | | 242/295 |
| 2001/0038052 | A1* | 11/2001 | Oishi | A01K 89/01907 |
| | | | | 242/255 |
| 2008/0073455 | A1* | 3/2008 | Terauchi | A01K 89/017 |
| | | | | 242/250 |
| 2011/0011966 | A1* | 1/2011 | Takechi | A01K 89/0192 |
| | | | | 242/255 |
| 2015/0201599 | A1 | 7/2015 | Yin et al. | |

FOREIGN PATENT DOCUMENTS

| | | | | |
|---|---|---|---|---|
| JP | H06-72368 U | 10/1994 | | |
| JP | 2005295905 A | 10/2005 | | |
| JP | 2008178306 A | 8/2008 | | |
| JP | 2009124942 A * | 6/2009 | | |
| JP | 2014212739 A | 11/2014 | | |
| JP | 2022-101752 A | 7/2022 | | |
| KR | 20160042754 A * | 4/2016 | | A01K 89/045 |
| KR | 20170113016 A * | 10/2017 | | A01K 89/015 |

OTHER PUBLICATIONS

Jul. 1, 2025 Office Action issued in Japanese Patent Application No. 2022-144007.
"Fishing Method Using Loosened Drag"; Selffish; Apr. 13, 2019.

* cited by examiner

ELECTRIC FISHING REEL

CROSS-REFERENCE TO RELATED APPLICATION

This application claims priority under 35 U.S.C. § 119 to Japanese Patent Application No. 2022-144007 filed on Sep. 9, 2022 in the Japanese Patent Office, the entire contents of each hereby incorporated by reference.

FIELD

The present disclosure relates to an electric fishing reel.

BACKGROUND

Conventionally, various electric fishing reels including a drag mechanism have been known.

As such an electric fishing reel, for example, JP 2014-212739 A discloses a dual-bearing reel that unwinds a fishing line forward includes a reel main body, a handle rotatably provided on a side portion of the reel main body in a line winding direction, a spool that rotates in the line winding direction in conjunction with rotation of the handle in the line winding direction, a rotation transmission mechanism that has a drive shaft to which the handle is integrally rotatably connected and transmits rotation of the handle in the line winding direction to the spool, and a drag mechanism having an operating member that is integrally rotatably and relatively rotatably engaged with an outer peripheral surface of the drive shaft and is movable in an axial direction with respect to the drive shaft by relative rotation with the drive shaft, and a friction mechanism that is disposed on the drive shaft and has a drag force changing according to a moving amount of the operating member in the axial direction, and the drag mechanism that brakes rotation of the spool in the line winding direction, in which the operating member moves in a direction in which the drag force increases by relatively rotating with respect to the drive shaft in a direction opposite to the line winding direction of the handle.

SUMMARY

When the drag is loosened, a nut inside a star drag moves in a direction away from a drive gear, and attempts to generate a gap between braking members, but the gap is absorbed by a spring washer. However, when the state in which the drag is continuously tightened continues, in a case where creep occurs in the spring washer or wear of the drag washer or the like occurs due to repeated use, the gap cannot be absorbed by the spring washer, looseness occurs in the drive gear or the braking member, and a failure such as detachment of the stopper for preventing reverse rotation of the handle occurs.

In recent years, there has been a demand for a more compactness, exertion of higher drag force, and a lower drag free property at the same time, and accordingly, as a main method for improving the drag force, the number of drag washers has been increased. In the conventional method including a dual-bearing reels as in JP 2014-212739 A, by providing a rib on an upper portion of the drag mechanism, the drive gear can be prevented from moving to the handle side even when the drag is loosened and backlash occurs. However, such a method has a problem that the number of drag washers cannot be increased due to the presence of the rib on the upper portion of the drag mechanism.

The present disclosure has been made in view of the above circumstances, and an object of the present disclosure is to provide an electric fishing reel capable of changing a configuration of a drag washer without changing a basic shape of a side plate on a handle side, and capable of avoiding the above stopper failure, and thus sharing a basic structure with various models, thereby significantly reducing development cost and investment. Purposes of the present disclosure other than this object will be clarified by referring to the overall description disclosed herein.

An electric fishing reel according to an embodiment of the present disclosure comprises a reel main body that comprises a left frame and a right frame and side plates covering the left and right frames, an operating part that is provided on a side of the left frame or a side of the right frame of the reel main body and is rotatable, a handle shaft of the operating part, a drive gear that comprises a cylindrical portion and a tooth surface provided on an outer periphery of the cylindrical portion and is rotatably frictionally coupled to the handle shaft, and a drag washer that is non-rotatably fitted to the handle shaft and is provided at an end of the drive gear on a side in a direction of the handle shaft, in which a protruding portion protruding in a direction of the drive gear from an inside of the side plate covering the left frame or the right frame is provided, and an end of the protruding portion is formed to be separated by a distance equal to or less than 3.0 mm with respect to an upper surface of the drive gear as viewed in the direction of the handle shaft.

In the electric fishing reel according to the embodiment of the present disclosure, the end of the protruding portion is formed to be separated by a distance equal to or less than 3.0 mm with respect to an upper surface of the tooth surface of the drive gear as viewed in the direction of the handle shaft.

In the electric fishing reel according to the embodiment of the present disclosure, the end of the protruding portion is formed to be separated by a distance equal to or less than 3.0 mm with respect to an upper surface of the cylindrical portion of the drive gear as viewed in the direction of the handle shaft.

In the electric fishing reel according to the embodiment of the present disclosure, the protruding portion is formed integrally with the side plate covering the left frame or the right frame. Further, in the electric fishing reel according to the embodiment of the present disclosure, the protruding portion is formed separately from the side plate covering the left frame or the right frame.

In the electric fishing reel according to the embodiment of the present disclosure, the protruding portion is a rib formed in a C shape in a circumferential direction of the handle shaft.

According to the above embodiment, the configuration of the drag washer can be changed without changing the basic shape of the side plate on the handle side, and the stopper failure can be avoided. Thus, the basic structure can be shared with various models, whereby the electric fishing reel that can significantly reduce the development cost and the investment can be provided.

DETAILED DESCRIPTION

Figure 1:
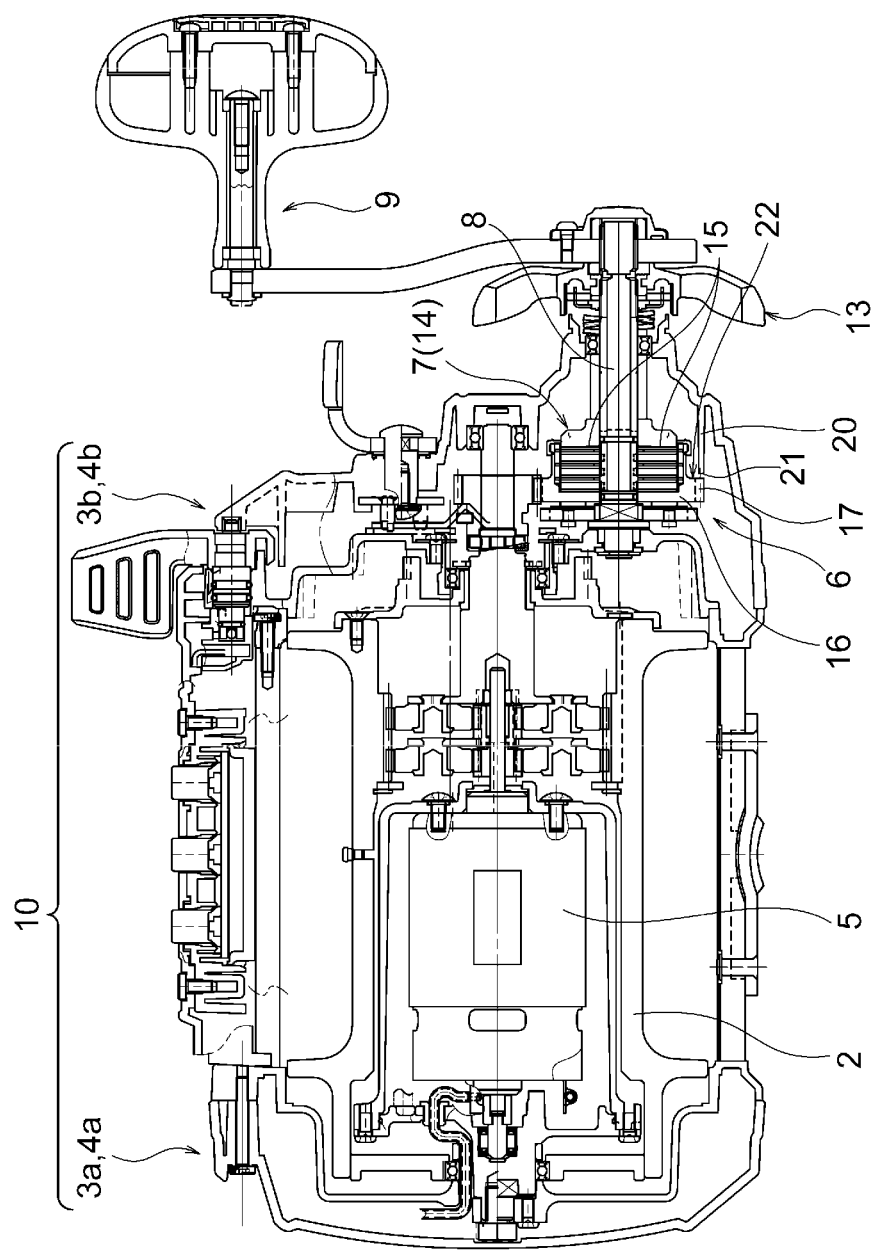
FIG. 1 is a diagram for explaining an internal structure of an electric reel according to an embodiment of the present disclosure.

An embodiment of an electric fishing reel according to the present disclosure will now be described in detail with reference to the accompanying drawings. Components common in a plurality of drawings are assigned with the same reference signs throughout the plurality of drawings. It should be noted that for the convenience of description, the drawings are not always shown in a precise aspect ratio.

First, a basic configuration of an electric reel (electric fishing reel) 1 according to an embodiment of the present disclosure will be described with reference to FIG. 1. As illustrated in the drawing, the electric reel 1 winds a fishing line around the spool 2, switches between a state in which the fishing line can be discharged from the spool 2 and a state in which the fishing line cannot be discharged from the spool 2, and causes the spool 2 to idle when a tension equal to or greater than a set value is applied to the fishing line (drag function), and moreover, a threshold tension can be set to adjust a braking force for preventing backlash at the time of a loading drop or a cast (throwing).

As illustrated in FIG. 1, the electric reel 1 comprises a reel main body 10 having left and right frames 3a and 3b arranged to be separated from each other in the left and right direction, and side plates 4a and 4b covering the left and right frames 3a and 3b. A spool 2, a motor (electric motor) 5, a drive gear 6, and a drag mechanism 7 are provided between the left and right frames 3a and 3b. Here, details of the drive gear 6 and the drag mechanism 7 will be described later. A handle shaft 8 is rotatably supported by the right frame 3b and the right side plate 4b, and an operating part (handle) 9 is attached to an end of the handle shaft 8. Note that, although the case where the handle shaft 8 and the operating part (handle) 9 are provided on the right frame 3b side has been described as an example, they may be provided on the left frame 3a side (the same applies throughout the present specification). In addition, the same applies to other accompanying constituent members as appropriate (the same applies throughout the present specification).

The left and right frames 3a and 3b are portions forming the framework of the reel main body 10, and are formed of, for example, a metal material such as an aluminum alloy or a magnesium alloy, but are not limited thereto. The left and right frames 3a and 3b are integrated via a plurality of posts (not illustrated).

The spool 2 is rotationally driven in a fishing line winding direction via a deceleration mechanism or the like by the rotational drive of the motor 5. The deceleration mechanism is provided on the left frame 3a side and decelerates the output of the motor 5.

The left end portion of the handle shaft 8 is supported by a bearing provided in the right frame 3b. The bearing is locked to a ring-shaped retaining member so as not to fall off. Further, a ratchet (not illustrated), a transmission gear (not illustrated), and a drive gear (not illustrated) disposed closer to the handle 9 side than the bearing do not fall off from the handle shaft 8. Furthermore, a lining washer (not illustrated) is interposed between the transmission gear and the ratchet so that the ratchet does not directly abut on the transmission gear. Accordingly, when the drive gear and the transmission gear rotate relative to the handle shaft 8, it is difficult to receive a frictional force with the ratchet.

The ratchet has a saw tooth shape, and is a gear for transmitting a rotational driving force of a winding operation of the handle 9 to a clutch mechanism as is known, or for preventing reverse rotation of the handle shaft 8 by engaging with a claw member. Further, the drag mechanism 7 is formed on the right surface of the drive gear.

When a power transmission mechanism is in a power transmission state (clutch ON), the force acting on the fishing line due to drawing of fish or the like is transmitted to the drive gear via the spool 2 (a spool shaft and a pinion). Here, the drive gear is frictionally coupled to the handle shaft 8, through which reverse rotation is prevented via the drag mechanism 7. Thus, when the force transmitted to the drive gear is larger than a frictional engagement force (braking force) with the drag mechanism 7, the drive gear rotates about the handle shaft 8.

As a result, in a case where a force such as drawing of a fish is very large, the spool 2 rotates to pull out the fishing line, and the cutting of the fishing line is prevented. Note that the handle shaft 8 is prevented from reversely rotating due to drawing of the fishing line by a roller type one-way clutch and the ratchet.

Further, the drag mechanism 7 that applies a braking force to the drive gear comprises a star drag 13 that presses a component inserted through the handle shaft 8 toward the drive gear, and a braking unit 14 that is inserted through the handle shaft 8 and pressed by the star drag.

The braking unit 14 of the drag mechanism 7 comprises a drag washer 15 and the like. Further, the drag washer 15 is disposed in the cylindrical portion (drag accommodating portion) 16 of the drive gear, and the drag washer 15 is detachably fitted to the handle shaft 8 so as to be axially movable. Further details of the basic configuration of the electric reel (electric fishing reel) 1 will be omitted.

Next, an electric fishing reel 1 according to an embodiment of the present disclosure will be described with reference to FIGS. 1 to 5. An electric fishing reel 1 according to an embodiment of the present disclosure is an electric reel for fish 1 comprising a reel main body 10 that comprises a left frame 3a and a right frame 3b and side plates 4a and 4b covering the left and right frames 3a and 3b, an operating part 9 that is provided on a side of the left frame 3a or a side of the right frame 3b of the reel main body 10 and is rotatable, a handle shaft 8 of the operating part 9, a drive gear 6 that comprises a cylindrical portion 16 and a tooth surface 17 provided on an outer periphery of the cylindrical portion 16 and is rotatably frictionally coupled to the handle shaft 8, and a drag washer 15 that is non-rotatably fitted to the handle shaft 8 and is provided at an end 18 of the drive gear 6 on a side in a direction of the handle shaft 8, in which a protruding portion 20 protruding in a direction of the drive gear 6 from an inside of the side plate 4b covering the left frame 3a or the right frame 3b (in the case of FIGS. 1 to 5) is provided, and an end (end surface) 21 of the protruding portion 20 is formed to be separated by a distance equal to or less than 3.0 mm with respect to an upper surface 22 of the drive gear 6 as viewed in the direction of the handle shaft 8. Here, the reason for the distance being equal to or less than 3.0 mm is that the thickness of the stopper is about 3.0 mm, and in order to prevent the stopper from being detached, a gap (3.0 mm) corresponding to the thickness of the stopper is not provided. This makes it possible to prevent the stopper from coming off. On the other hand, if a gap equal to or larger than the thickness (3.0 mm) of the stopper is provided, the stopper is detached, and the meaning of providing the rib is lost.

With the electric fishing reel 1 according to the embodiment of the present disclosure, the configuration of the drag washer can be changed without changing the basic shape of the side plate on the handle side, and the stopper failure can be avoided. Thus, the basic structure can be shared with various models, whereby the electric fishing reel that can significantly reduce the development cost and the investment can be provided.

Figure 2:
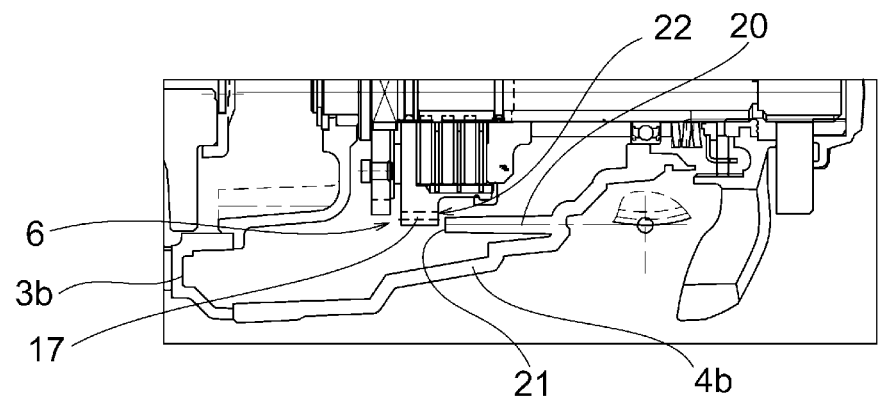
FIG. 2 is a diagram for explaining a part of an internal structure of the electric reel according to the embodiment of the present disclosure.

Further, as illustrated in FIG. 2, in the electric fishing reel 1 according to one embodiment of the present disclosure, the end (end surface) 21 of the protruding portion 20 is formed so as to be separated by a distance equal to or less than 3.0 mm with respect to the upper surface 22 (for example, it is a cylindrical end surface on which the tooth surface 17 is formed) of the tooth surface 17 of the drive gear 6 as viewed in the direction of the handle shaft 8. In this manner, even if the drag is loosened and the drive gear becomes movable to the handle side, the protruding portion 20 and the tooth surface 17 of the drive gear 6 come into contact with each other and the further movement is restricted, so that the rib on an upper portion of the drag mechanism can be removed and the number of drag washers can be changed. In addition, the disengagement of the stopper is also improved for a similar reason.

Figure 4:
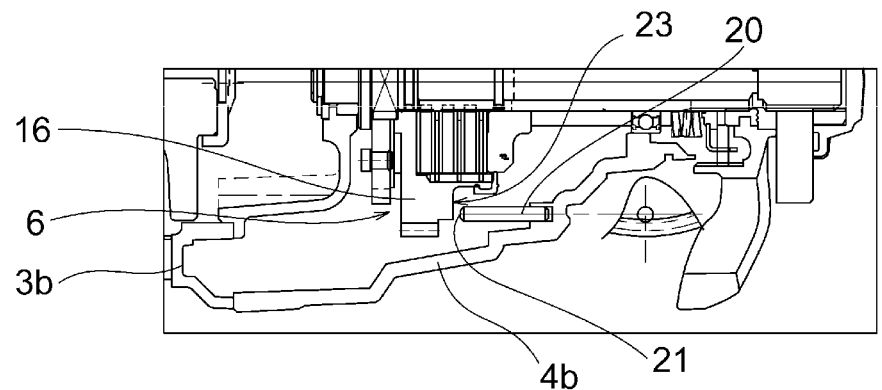
FIG. 4 is a diagram for explaining a part of an internal structure of the electric reel according to the embodiment of the present disclosure.

Further, as illustrated in FIG. 4, in the electric fishing reel 1 according to one embodiment of the present disclosure, the end (end surface) 21 of the protruding portion 20 is formed so as to be separated by a distance equal to or less than 3.0 mm with respect to the upper surface 23 of the cylindrical portion 16 of the drive gear 6 as viewed in the direction of the handle shaft 8. Note that the gear side of the drive gear 6 is formed in a drag housing portion of the drive gear 6. Even if the drag is loosened and the drive gear 6 becomes movable to the handle side, the protruding portion 20 and the cylindrical portion 16 of the drive gear 6 come into contact with each other and further movement is restricted, so that it is possible to eliminate the rib on the upper portion of the drag mechanism and to change the number of drag washers. In addition, the disengagement of the stopper is also improved for a similar reason.

Further, in the example of FIG. 2, in the electric fishing reel 1 according to one embodiment of the present disclosure, the protruding portion 20 is formed integrally with the side plate 4a or 4b covering the left frame 3a or the right frame 3b. Thus, restriction of the drive gear is possible, and the number of drag washers can be changed in utilizing the same side plate. Further, the deviation of the described stopper is also improved for similar reasons.

Figure 3:
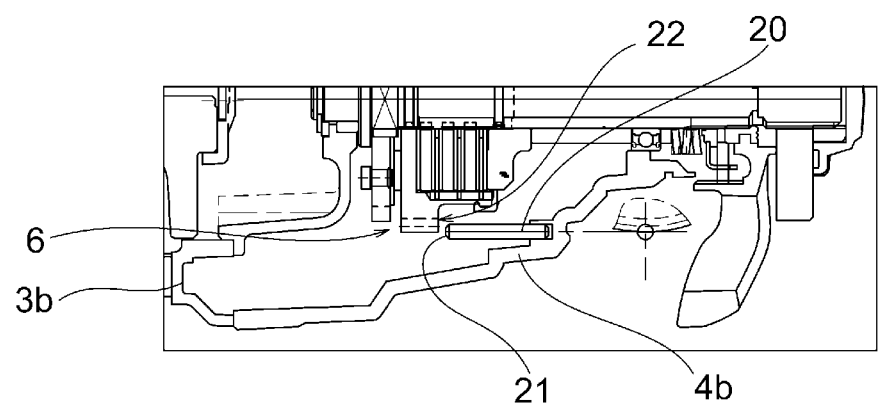
FIG. 3 is a diagram for explaining a part of an internal structure of the electric reel according to the embodiment of the present disclosure.

Further, in the example of FIG. 3, in the electric fishing reel 1 according to one embodiment of the present disclosure, the protruding portion 20 is formed separately from the side plate 4b covering the left frame 3a or the right frame 3b. Thus, restriction of the drive gear is possible. In addition, the protruding portion 20 can be formed separately from the side plate 4b, and the manufacturing cost can be reduced as compared with a case where the protruding portion is integrally manufactured.

Figure 5:
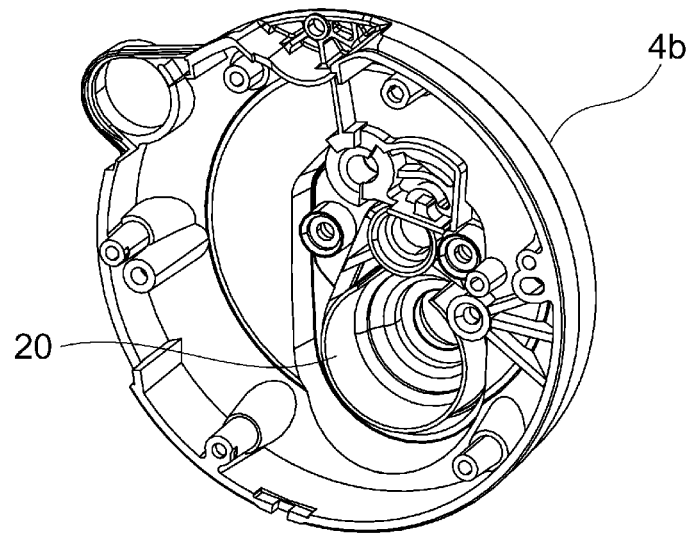
FIG. 5 is a diagram for explaining a protruding portion in the electric fishing reel 1 according to the embodiment of the present disclosure.

Further, as illustrated in FIG. 5, in the electric fishing reel 1 according to an embodiment of the present disclosure, the protruding portion 20 is a rib formed in a C shape when viewed in the circumferential direction of the handle shaft 8. The C-shaped rib can be formed as, for example, a circular rib excluding the pinion at the maximum, that is, a C-shaped rib. Thus, restriction of the drive gear is possible. Further, for example, in the embodiment shown in FIG. 5, the protruding portion 20 is formed in a C shape, but is not particularly limited thereto. For example, the shape may be a semicircular shape or a shape comprising a plurality of pins. That is, the protruding portion 20 only needs to have a function of restricting the drive gear 6 from moving to the handle side.

Dimensions, materials, and arrangements of the components described in this specification are not limited to those explicitly described in the embodiments, and the components may be modified to have any dimensions, materials, and arrangements that may fall within the scope of the present disclosure. In addition, components not explicitly described herein can be added to the described embodiments, or some of the components described in each embodiment can be omitted.

What is claimed is:

1. An electric fishing reel, comprising:
   a reel main body that comprises a left frame and a right frame and side plates covering the left and right frames;
   an operating part that is on a side of the left frame or a side of the right frame of the reel main body and is rotatable;
   a handle shaft of the operating part;
   a drive gear that comprises a cylindrical portion and a tooth surface on an outer periphery of the cylindrical portion and is rotatably frictionally coupled to the handle shaft;
   a drag washer that is non-rotatably fitted to the handle shaft and is at an end of the drive gear on a side in a direction of the handle shaft, and
   a protruding portion protruding in a direction of the drive gear from an inside of the side plate covering the left frame or the right frame, wherein
   an end of the protruding portion is separated by a distance equal to or less than 3.0 mm with respect to an upper surface of a tooth surface of the drive gear as viewed in the direction of the handle shaft, and
   the protruding portion is in areas excluding an area of a pinion when viewed in the direction of the handle shaft.

2. The electric fishing reel according to claim 1, wherein the protruding portion is formed integrally with the side plate covering the left frame or the right frame.

3. The electric fishing reel according to claim 1, wherein the protruding portion is formed separately from the side plate covering the left frame or the right frame.

4. The electric fishing reel according to claim 1, wherein the protruding portion is a rib formed in a C shape in a circumferential direction of the handle shaft.

* * * * *